(No Model.)

J. THIERRY.
WHEEL.

No. 463,877. Patented Nov. 24, 1891.

Witnesses:
P. M. Hulbert
M. B. Dougherty.

Inventor:
James Thierry
By Thos. M. Maynedson
Attys.

UNITED STATES PATENT OFFICE.

JAMES THIERRY, OF OTTER LAKE, MICHIGAN.

WHEEL.

SPECIFICATION forming part of Letters Patent No. 463,877, dated November 24, 1891.

Application filed September 9, 1890. Renewed August 31, 1891. Serial No. 404,281. (No model.)

*To all whom it may concern:*

Be it known that I, JAMES THIERRY, a citizen of the United States, residing at Otter Lake, in the county of Lapeer and State of Michigan, have invented certain new and useful Improvements in Vehicle-Wheels, of which the following is a specification, reference being had therein to the accompanying drawings.

This invention relates to new and useful improvements in vehicle-wheels; and the invention consists in the peculiar construction of the felly or the tire, whereby a pocket or receptacle is made between the tire and felly adapted to receive a fluid—such as oil, water, &c.—to prevent the shrinking of the felly and the loosening of the tire, all as more fully hereinafter described.

Figure 1:
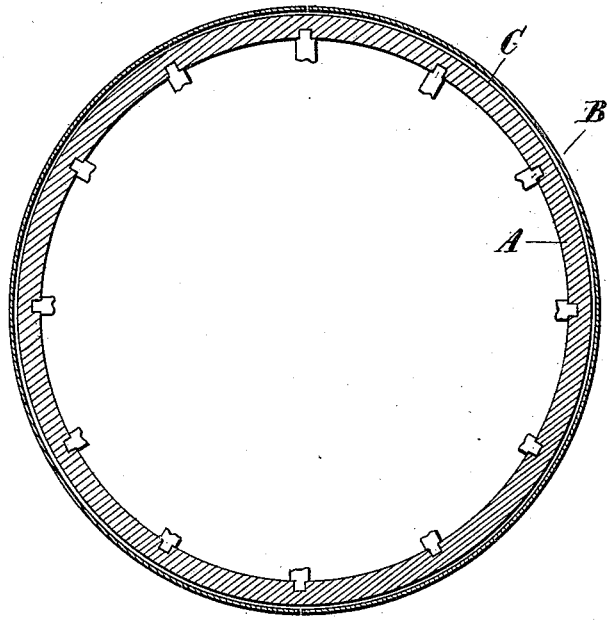
Figure 2:
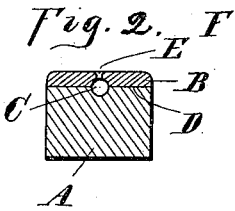

In the drawings, Figure 1 is a vertical central section through the felly of a vehicle-wheel. Fig. 2 is a cross-section thereof.

In the present state of the art when the wheel is first made, the tire being shrunk on, in a comparatively short time in dry weather the tire will become loose and require to be reset. It frequently happens that a tire having become slightly loose the wheel is broken if it is used with heavy loads or on rough roads, and is therefore a continual expense and annoyance, which my invention is intended to overcome.

To this end I form between the felly A and the tire B a pocket or groove C, made partially in the tire and partially in the felly, a bearing D being formed on either side of the groove between the tire and the felly. In shrinking the tire in position in the usual manner this makes a perfectly water-tight joint, a closed receptacle being formed therein. This receptacle I preferably arrange extended entirely around the felly and form suitable apertures at two or more points in the tire, filling them in any suitable manner, such as by a screw-threaded plug E, having a countersunk head. After the wheel is complete this receptacle can be filled with fluid of any kind, preferably oil, which will penetrate in the wood, keeping it moist at all times and preventing the shrinking of the felly, and thereby preventing all difficulty, trouble, and expense heretofore incurred in dry weather.

By the above construction the following results are obtained: Were the tire to work to one side or partly off the felly, the liquid would come in contact with the top, swelling the same and preventing further movement; and, further, should the opposite wall of the groove in the tire come in contact with the wall opposite the groove in the felly, it would be prevented from going farther, as the felly would be swollen at this point and slightly project into the groove in the tire. By constructing the wheel in the manner claimed the felly is not so much weakened as in the case where the groove is wholly in the same.

What I claim as my invention is—

A wheel having a wooden felly formed with a channel in its periphery and a metal tire having a channel in its inner face registering with the channel in the felly, whereby a liquid storage-chamber is formed, substantially as described.

In testimony whereof I affix my signature in presence of two witnesses.

JAMES THIERRY.

Witnesses:
FANNY K. SHERMAN,
HELEN B. SHERMAN.